United States Patent
Woodall, Jr.

(10) Patent No.: US 8,616,721 B1
(45) Date of Patent: Dec. 31, 2013

(54) SOLAR AWNING AND METHOD

(75) Inventor: Robert C. Woodall, Jr., Panama City, FL (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 269 days.

(21) Appl. No.: 13/373,246

(22) Filed: Nov. 4, 2011

(51) Int. Cl.
| | |
|---|---|
| *F21L 4/08* | (2006.01) |
| *F21S 4/00* | (2006.01) |
| *F21V 21/32* | (2006.01) |
| *H01L 31/045* | (2006.01) |
| *B60Q 1/24* | (2006.01) |
| *F21S 8/10* | (2006.01) |
| *E04H 15/08* | (2006.01) |

(52) U.S. Cl.
USPC ...... 362/183; 362/234; 362/249.08; 362/485; 362/543; 135/88.11; 135/96; 136/245; 320/101

(58) Field of Classification Search
USPC .............. 362/183, 234, 249.04, 249.08, 485, 362/543; 320/101; 136/245; 135/88.1, 135/88.11, 88.12, 96; 296/163
See application file for complete search history.

(56) References Cited

U.S. PATENT DOCUMENTS

| | | | | | |
|---|---|---|---|---|---|
| 5,107,637 | A | * | 4/1992 | Robbins | 362/183 |
| 5,180,223 | A | * | 1/1993 | McNamee | 362/485 |
| 5,192,111 | A | * | 3/1993 | Hanemaayer | 135/88.1 |
| 5,969,501 | A | * | 10/1999 | Glidden et al. | 320/101 |
| 6,660,927 | B2 | * | 12/2003 | Zwanenburg | 136/245 |
| 7,108,388 | B2 | * | 9/2006 | Li | 362/234 |
| 7,980,725 | B2 | * | 7/2011 | Yu et al. | 362/183 |
| 2006/0028166 | A1 | * | 2/2006 | Closset et al. | 320/101 |
| 2010/0156339 | A1 | * | 6/2010 | Hoffman | 320/101 |

* cited by examiner

*Primary Examiner* — Alan Cariaso
(74) *Attorney, Agent, or Firm* — James T. Shepherd (57) ABSTRACT

A solar awning system is provided with a spool housing containing a sheet of flexible solar light array material rolled into a spool within the spool housing. The spool is rotatably mounted for spooling and unspooling the flexible sheet to and from the spool housing. The spool housing may be attached to a wall or other object or mounted on supports to quickly provide a shaded and lighted region at a desired location. The flexible sheet is quickly retracted into the spool housing to pack up, whereupon the spool housing protects the flexible solar light array material for subsequent use.

13 Claims, 7 Drawing Sheets

SOLAR AWNING AND METHOD

STATEMENT OF GOVERNMENT INTEREST

The invention described herein may be manufactured and used by or for the Government of the United States of America for governmental purposes without the payment of any royalties thereon or therefore.

CROSS REFERENCE TO OTHER PATENT APPLICATIONS

None.

BACKGROUND OF THE INVENTION (1) Field of the Invention

The present invention relates generally to solar energy systems and, more specifically, to a mountable solar powered system which conveniently provides shade and quiet lighting at any desired location without the need for additional wiring.

(2) Description of the Prior Art

Retractable awnings have been utilized in various fashions over time. Typically, retractable awnings have been fastened to stationary objects like homes to provide protection from ultraviolet rays. These awnings have provided shade for people on the exterior of the home, like on a patio, and also help control interior temperature by blocking the heat from the sun from radiating inside the home. However, prior art awnings do not inherently provide lighting for night time use, which would require outdoor lights, power cables, and so forth, assuming power is readily available without the need for generators.

Solar power systems are often greatly preferred due to the absence of noise created by fuel operated generators. In some cases, including off-grid recreational use, noise is a consideration of importance whereas generators may be less desirable or undesirable.

Solar systems may also be considerably less costly than other types of power sources in more remote areas where power from centralized generators is unavailable. In some cases, the cost to continuously transport and store fuel greatly enhances the cost desirability of solar systems. For military uses in difficult regions, transporting fuel can be very costly as well as dangerous, making solar powered systems a very viable energy alternative.

In rugged off-grid areas, islands, regions without roads, deserts, and the like, solar power can be a more desirable source of energy both in terms of reliability and cost.

However, problems with prior art solar systems include being difficult to pack up, cumbersome to set up or break down, bulky, inadequately protected during transport, and/or undesirably inefficient for collecting solar energy during operation.

The following patent references are related to solar power supply systems and/or solar power features and/or awnings.

U.S. Pat. No. 2,015,993 to F. Drake, issued Oct. 1, 1935, discloses a rolling universal window screen of a type to be moved horizontally across a window opening. A roller housing containing a spring roller on which the screen cloth is wound is adapted to be fastened on the side frame of the window opening. U.S. Pat. No. 2,015,993 is hereby incorporated herein by reference.

U.S. Pat. No. 8,018,098, to Y. J. Lu, issued Sep. 13, 2011, discloses a solar power supply system and its applying device. The power supply system includes a receiving unit, a control block and a storage unit. After the receiving unit receives solar power, the control block is used for storing the solar power into the storage unit. If a user wants to use a portable information processing device or other portable products, the portable solar power supply system supplies electric power to the device or product.

U.S. Pat. No. 6,410,362, to E. J. Simburger, issued Jun. 25, 2002, discloses a flexible thin film solar cell. A clear thermal emissive coating, such as clear polyimide, is deposited directly upon a thin film solar cell forming a flexible thin film solar cell. The thin film solar cell can be deposited on another thermal emissive coating used as a substrate during thin film solar cell semiconductor processing so that resulting flexible thin film solar cell can be illuminated on the top side and eject heat from both sides suitable for forming a solar cell array over a curved surface such as a power sphere nanosatellite with thermal regulation. U.S. Pat. No. 6,410,362 is hereby incorporated herein by reference.

The above listed references do not show the features of the present invention, which provides an easily stored and, if desired, transportable awning that also provides quiet lighting at night. The above references do not show a solar awning that is quickly deployed and just as quickly stowed away for use at another time or another location. Accordingly, those of skill in the art will appreciate the present invention which addresses the above discussed problems.

SUMMARY OF THE INVENTION

Accordingly, it is an object of the present invention to provide an improved solar powered awning.

Another possible object of the present invention is to provide a large solar collecting array in a deployable and retractable arrangement.

Another possible object of the invention is to provide for solar energy storage and access that can be easily packaged and deployed for use in diverse environments.

Another possible object of the invention is to provide overhead lighting integrated into an awning system.

Another possible object of the invention is to provide an easily stowable/deployable solar power and shade system which is protected from damage when the solar power system is in storage and shipping configuration.

Other objects and advantages of the present invention will become apparent from the following descriptions, taken in connection with the accompanying drawings, wherein, by way of illustration and example, an embodiment of the present invention is disclosed. However, it will be understood that the present invention is not limited to the above and/or other objects of the invention.

The present invention comprises an easily mountable and/or transportable solar awning to provide a shade during the day and at nighttime a lighted region at a desired location.

In one embodiment, the solar awning comprises a spool housing and a flexible sheet of flexible solar light array material rolled into a spool within the spool housing. The spool of flexible solar light material is rotatably mounted for spooling and unspooling the flexible sheet to and from the spool housing to cover and uncover the shaded and lighted region.

The flexible sheet of flexible solar light array material may comprise a plurality of solar cells affixed to the flexible sheet and a plurality of solar cell electrical conductors affixed to the flexible sheet, which electrically connect to the plurality of solar cells.

A plurality of lights are affixed to the flexible sheet and a plurality of light electrical conductors affixed to the flexible sheet electrically connect to the plurality of lights.

A spooling mechanism, which may be manual, automatic, or partially automatic, is mounted to the spool housing to control the spooling and unspooling of the flexible sheet to and from the spool housing for covering and uncovering the shaded and lighted region.

The solar awning may further comprise a rotary connector to electrically connect the plurality of solar cell conductors and the plurality of light conductors.

A rechargeable battery is mounted within the spool housing and is operably connected to the plurality of solar cell electrical conductors through the rotary connector for receiving power from the plurality of solar cells. The rechargeable battery may receive power from a charger that is directly connected to the solar cell electrical conductors.

The solar awning may further comprise a switch mounted within the spool housing operably connected to the rechargeable battery and to the plurality of light conductors through the rotary connector to turn on and off the plurality of lights.

The solar awning may further comprise at least one power outlet mounted to the spool housing operably connected to the rechargeable battery. An inverter may be directly connected to the rechargeable battery to provide A/C voltage to the power outlet.

The solar awning may further comprise one or more supports for supporting the flexible sheet above the shaded and lighted region when the flexible sheet is unspooled from the spool housing.

In another embodiment, the present invention provides a method for making a solar awning to provide a shaded and lighted region at a desired location. Method steps may comprise rolling a flexible sheet of flexible solar light array material onto a spool and rotatably mounting the spool of flexible solar light material within a spool housing for spooling and unspooling the flexible sheet to and from the spool housing.

Other steps may comprise electrically connecting a rotary connector to a plurality of solar cells through a plurality of solar cell electrical conductors which electrically connect to the plurality of solar cells on the flexible sheet.

The method may comprise electrically connecting the rotary connector to a plurality of lights affixed to the flexible sheet through a plurality of light electrical conductors affixed to the flexible sheet, which electrically connect to the plurality of lights.

Other steps may comprise affixing a spooling mechanism to the housing to control the spooling and unspooling of the flexible sheet to and from the spool housing for covering and uncovering the shaded and lighted region.

The method may further comprise mounting a rechargeable battery within the spool housing, and operably connecting the rechargeable battery to the plurality of solar cell electrical conductors through the rotary connector for receiving power from the plurality of solar cells.

The method may further comprise mounting a switch within the spool housing, and operably connecting the switch to the rechargeable battery and to the plurality of light conductors through the rotary connector to turn on and off the plurality of lights.

The method may further comprise mounting at least one power outlet to the spool housing, and operably connecting the power outlet to the rechargeable battery.

The method may further comprise providing one or more supports for supporting the flexible sheet above the shaded and lighted region when the flexible sheet is unspooled from the spool housing. In one possible embodiment, the supports are rounded to provide a curved shape for the flexible sheet to extend the hours during which power is collected.

BRIEF DESCRIPTION OF THE DRAWINGS

The drawings constitute a part of this specification and include exemplary embodiments of the invention, which may be embodied in various forms. It is to be understood that in some instances various aspects of the invention may be shown exaggerated or enlarged to facilitate an understanding of the invention.

DETAILED DESCRIPTION OF THE INVENTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
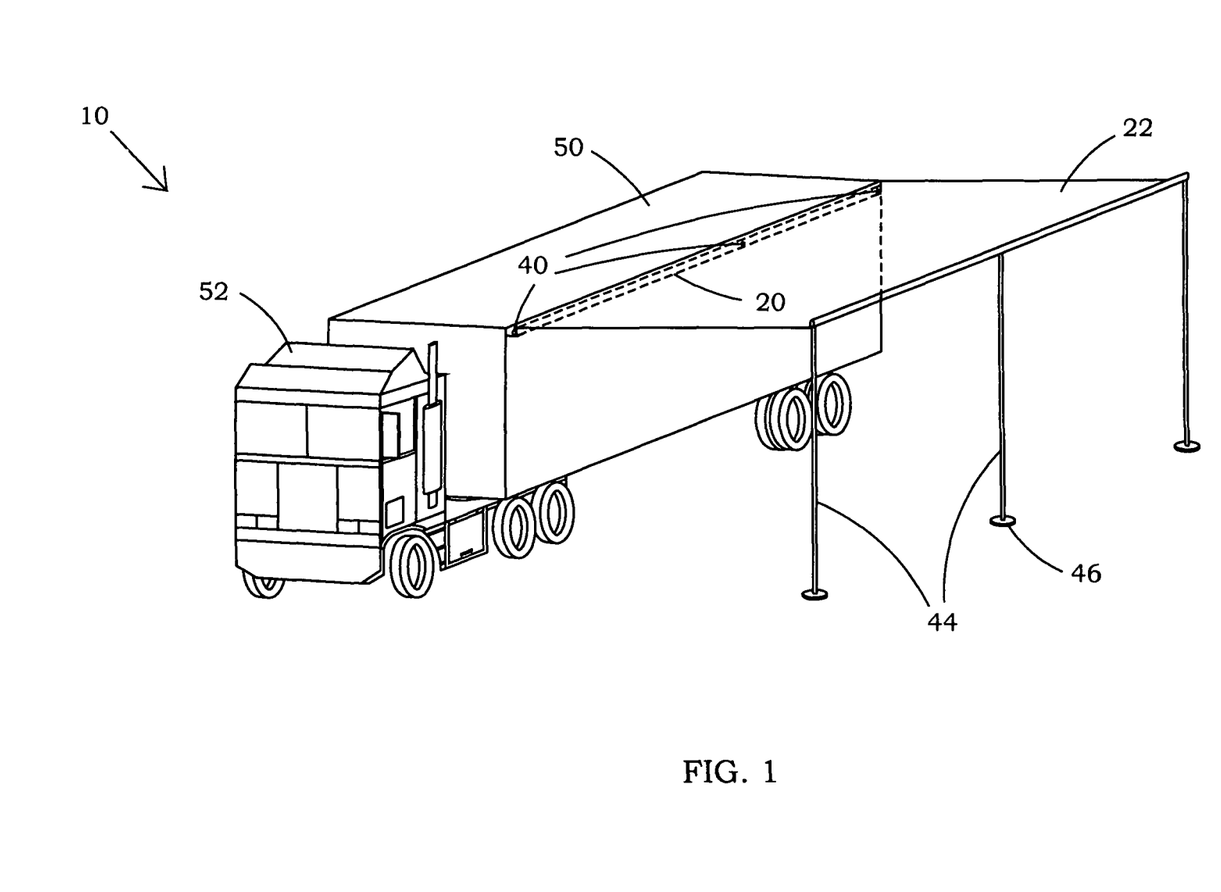
FIG. 1 is a perspective view, partially in hidden lines, of an electric generating retractable lighted solar awning in accordance with one possible embodiment of the present invention.
Figure 2:
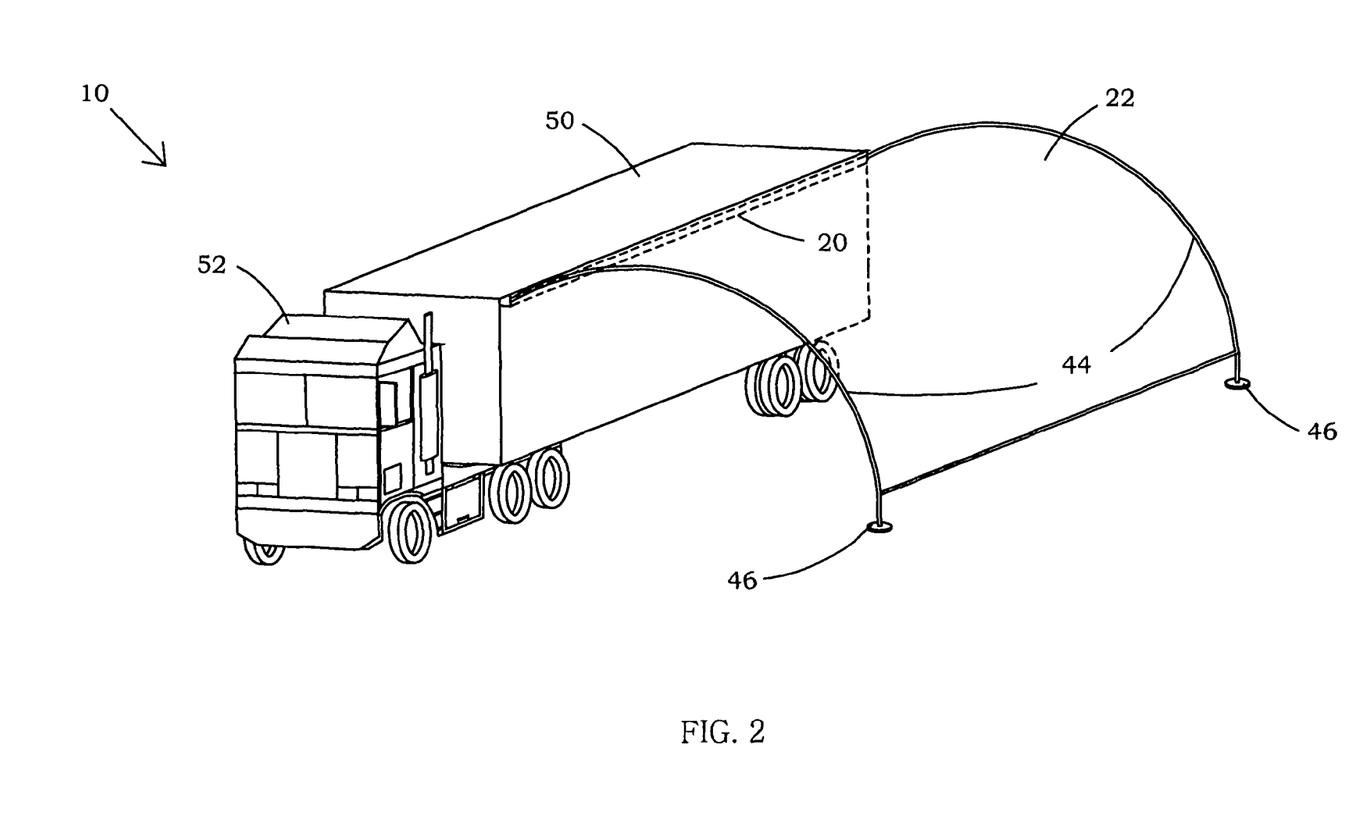
FIG. 2 is an alternative perspective view, partially in hidden lines, of an electric generating retractable lighted solar awning in accordance with another possible embodiment of the invention.

Turning now to the drawings, and more particularly FIG. 1 and FIG. 2, there are shown two different embodiments of lighted solar awning system 10, connected to cargo container 50 of vehicle 52. Awning system 10 provides a readily available deployable/retractable shaded region during the day and lighted region at night. Awning system 10 is easily transportable.

While the present invention is especially useful in transportable configurations, the present invention could also be utilized to enhance a gazebo or other outdoor structure in a yard to provide shading and lighting for outdoor parties and the like. The present invention is especially useful for setting up camp meeting areas where campers, such as boy scouts and the like, can meet and work on activities during the day or at night without the need for generators. An embodiment of lighted solar awning system 10 could also be used with a wall, side of a house, or other similar structure. Accordingly, while the present invention is described in terms of cargo truck applications it will be understood that the present invention has many other applications.

Referring to FIG. 1, FIG. 2, FIG. 4, and FIG. 5, flexible solar light array material 22 provides an awning, as discussed in more detail hereinafter. Flexible solar light array material 22 is stored in spool housing 12, which is part of spool assembly 20, which is shown in more detail in FIG. 3. Spool housing 12 may be secured to cargo container 50 in many ways.

In one embodiment, spool housing 12 may simply be bolted to cargo container 50 utilizing bolts or other fasteners 40. Other means of securing spool housing 12 to container 50 may comprise welding, snap press fit, hanging or hooking the spool housing 12 along a "V" channel on container 50 which mates to a channel on spool housing 12, mounting spool housing 12 in a recessed portion of container 50, and the like. In another embodiment, additional supports (not shown) other than supports 44 may be utilized to support spool housing 12 adjacent to cargo container 50 and/or allow spool housing 12 to be positioned separately from cargo container 50.

Figure 6:
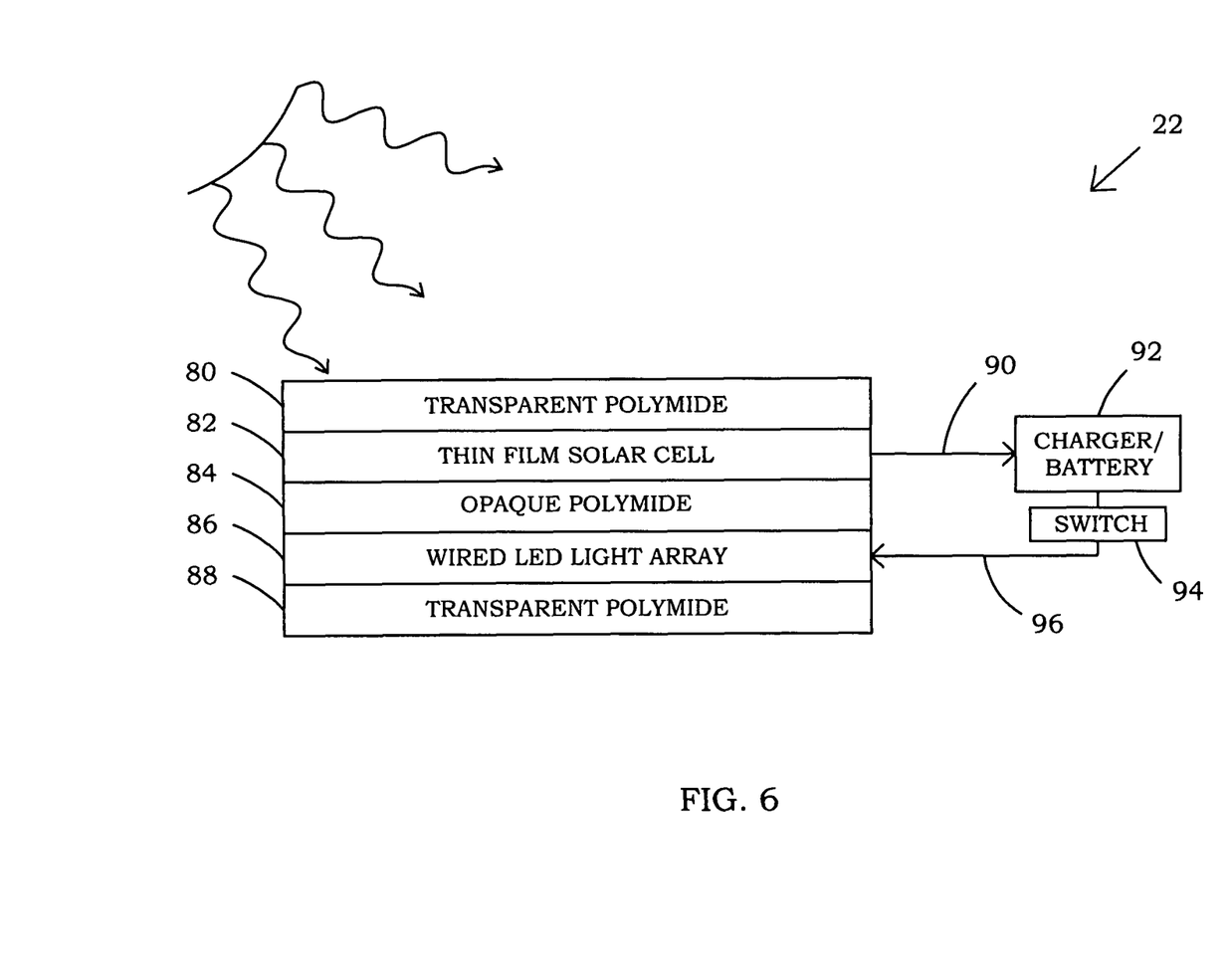
FIG. 6 is a block diagram of flexible solar film with integrated LED lighting in accordance with one possible embodiment of the invention.
Figure 7:
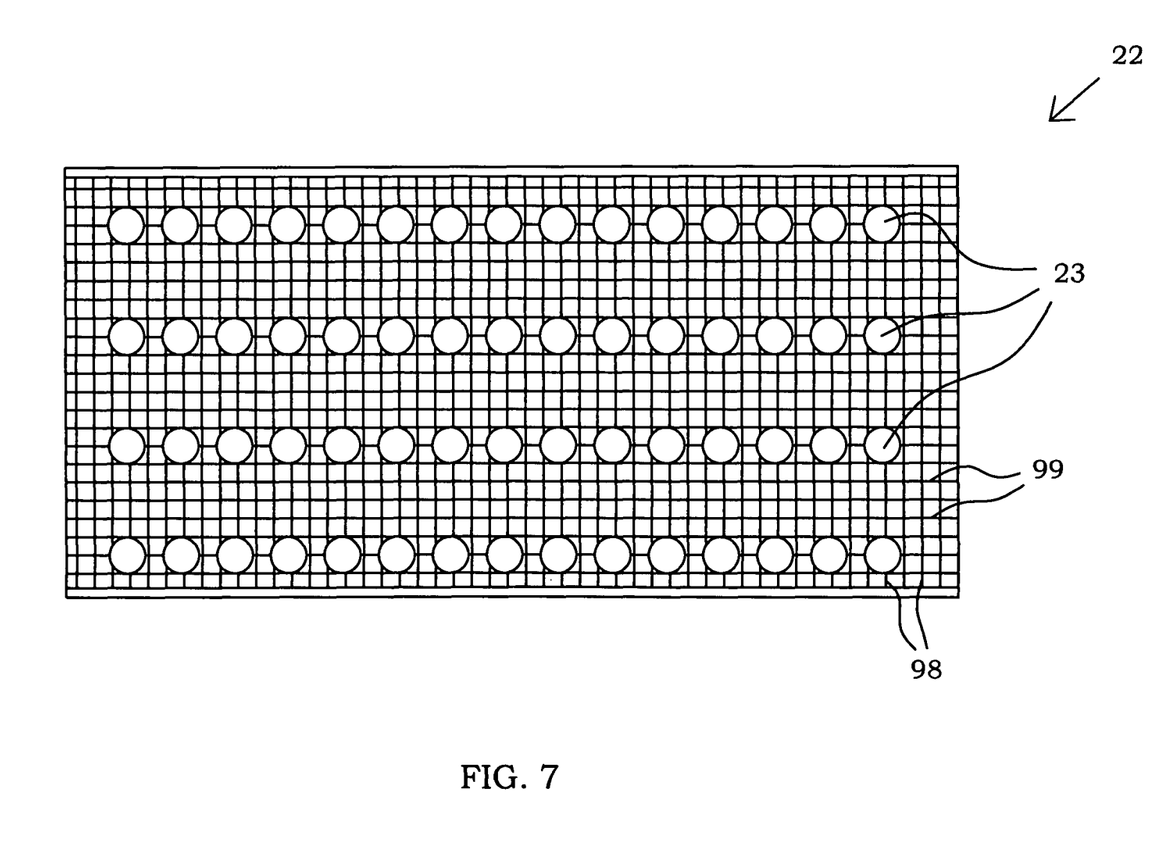
FIG. 7 is a representation of flexible solar film with an integrated LED array in accordance with one possible embodiment of the invention.

FIGS. 6 and 7 show more details of flexible solar light array material 22 in accordance with one possible embodiment. Referring to FIG. 6, an array of light emitting diodes (LEDs) 86 is mounted to the underside of a flexible solar material. In this embodiment, the flexible solar material comprises upper side transparent polymide layer 80, thin film solar cell layer 82, and opaque polymide layer 84. In this embodiment, an additional lower side transparent polymide layer 88 is utilized to secure LED array 86 to the flexible solar material. However, it will be understood that other flexible solar materials may be utilized. As well, other means for securing the LED array to the flexible solar material may be utilized to build or affix or integrate the LED array into the solar material.

Wiring 90 may be utilized to supply charger/battery device 92 for storing collected solar power. Switch 94 may be a manual switch, automatic switch, remotely controlled switch, or the like. When turned on, switch 94 connects to wiring harness 96, which in turn supplies LED array 86 with power for lighting purposes. Wiring harness 96 may also be built into flexible solar light array material 22. Other configurations might utilize switches built into the array which might be switched on or automatically turn on at night.

FIG. 7 shows one possible embodiment of a lower side of a sheet of flexible solar light array material 22 in accordance with one possible preferred embodiment. A suitable LED array may comprise various configurations with LEDs 23 being arranged in more than one possible configuration. Solar lighting wiring harness 96 may comprise wires or films or grids such as built in metallic wire or film electrical conductors 98, which connect to LEDs 23. Other metallic wire or film conductors 99 may be utilized to connect to the solar cells of the solar array. While LEDs are used for lighting, other low power lighting which may be available now or developed in the future could also be utilized.

Figure 3:
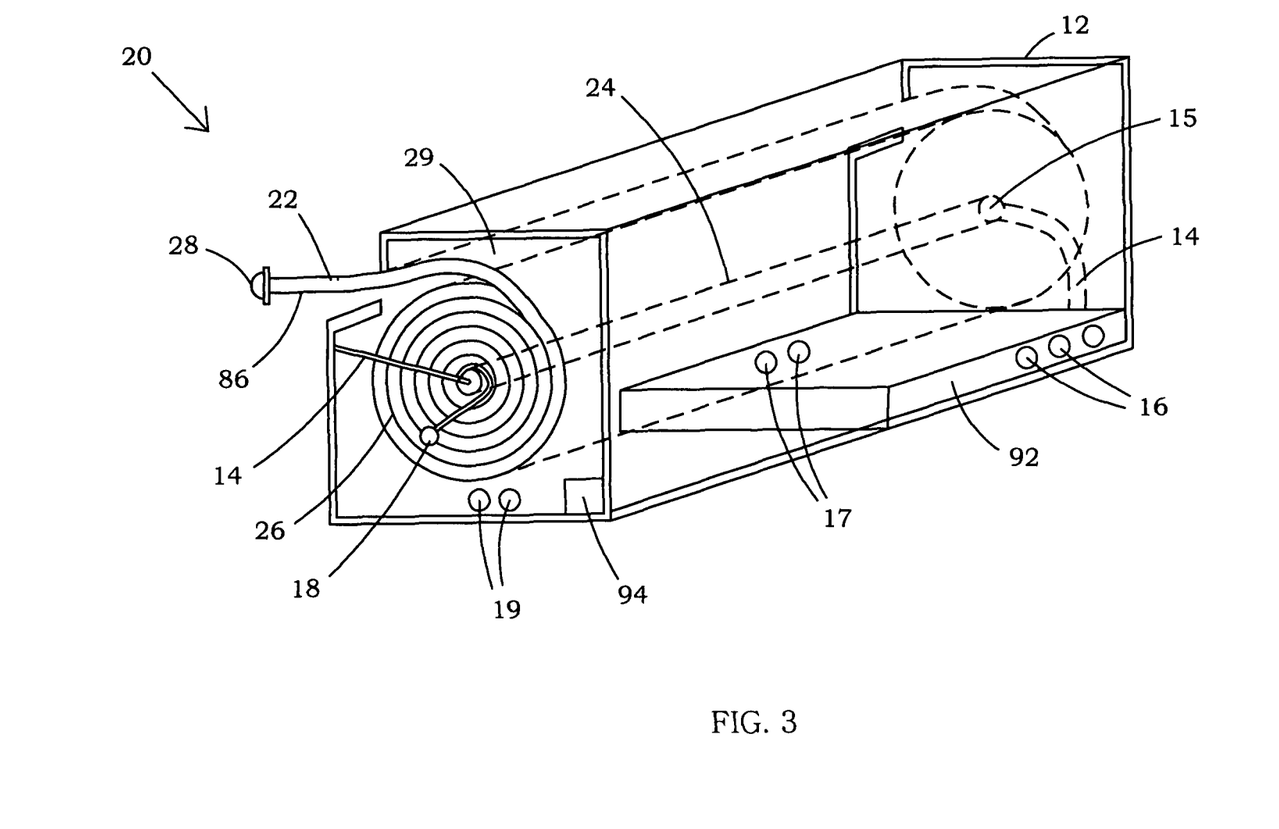
FIG. 3 is a perspective view, partially in hidden lines, of a retractable solar awning mechanism in accordance with one possible embodiment of the invention.
Figure 4:
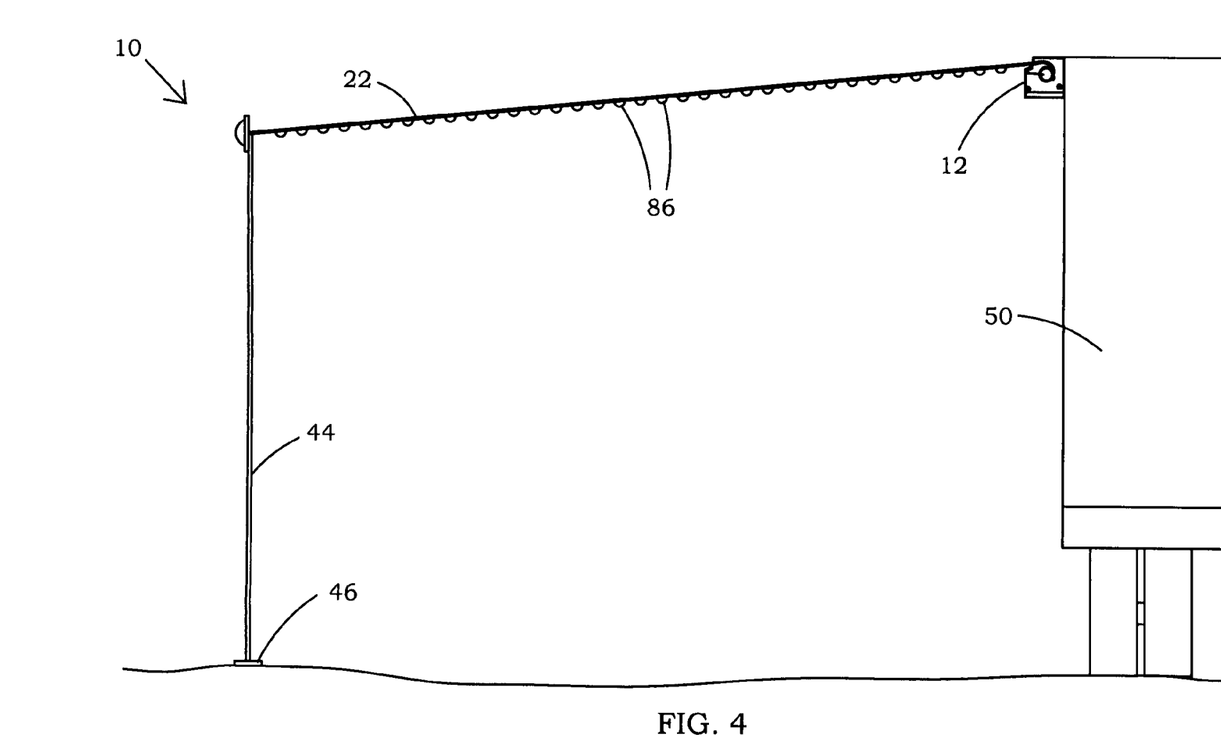
FIG. 4 is a side elevational view of the system of FIG. 1 in accordance with one possible embodiment of the invention.

FIG. 3 shows a spool assembly 20 to provide a retractable flexible solar light array in accord with one possible embodiment. Flexible solar light array material 22 is rolled around a shaft 24 to form spool 26, which may be spring loaded like a window shade to automatically roll flexible solar light array material 22 into and/or out of spool housing 12 when desired. Alternatively, shaft 24 may connect to a hand crank to manually roll and unroll, or a motor, to automatically roll and unroll flexible solar light array 22. Accordingly, many types of spooling mechanisms, including manual, automatic, or partially automatic may be utilized to control spooling of the flexible solar light array material 22 into and out of spool housing 12.

As discussed above, flexible solar light array 22 is a sheet of flexible solar voltaic sheeting that has been augmented with an attached array of light emitting diode lights (LED) 86. Spool assembly 20 comprises spool housing 12, which in one possible embodiment includes therein spring and lever action release and retraction mechanism 18 as the spooling mechanism. It will be noted that details for one possible embodiment for spring and lever action and retraction mechanism 18 for use in spool assembly 20 is taught in U.S. Pat. No. 2,015,993 which as discussed above, is incorporated herein by reference. However, as also discussed above, the present invention is not limited to this particular type of spooling mechanism.

In one embodiment, spool housing 12 carries charger/battery device 92, which is wired to flexible solar light array material 22 and built in LED light array 86 via internal electrical connection 14, which may include rotary electrical connector 15. Various suitable types of rotary electrical connectors are readily commercially available to permit electrical connection to the rolling flexible solar light array material 22.

Electrical connectors 16, 17, and 19 may be built into spool housing 12 wherever desired, and electrically connected to the charger/battery device 92 (for clarity of illustration, the electrical connections are not shown in the figures). If desired, charger/battery device 92 may also comprise an inverter to provide A/C power to connectors 16, 17, and or 19. Or, DC power may be utilized. If desired, a switch 94 may be mounted on spool housing 12 and/or provide for remote, programmed, or automatic control of the array. If desired, multiple switches may be utilized to turn on selected groups of LEDs.

The exposed longitudinal edge 28 of flexible solar light array material 22 extends out of spool housing 12 via slot 29. If desired, cables or handles, e.g., graphite cables (not shown), may be built into flexible solar light array material 22, such as at the sides, to provide structural reinforcement and carry the loads applied thereto.

Because flexible solar light array material 22 is relatively thin, a considerable amount of the material can be rolled up into a relatively small spool housing 12. However, spool housing 12 can be made larger to accommodate larger arrays to provide relatively large areas of shade and lighting.

Accordingly, spool assembly 20 is a self-contained unit which can be utilized in a wide variety of circumstances where it is desired to provide areas of shade and lighting and/or electrical outlets.

Once spool assembly 20 is secured to the vehicle or cargo container or otherwise mounted, the user grabs flexible solar light array material 22 on exposed longitudinal edge 28 and pulls it outward. In one embodiment, spring and lever action release and retraction mechanism 18 cams out of the way and allows for the free release of flexible solar array 22. Easing of the pulling force allows main tension spring mechanism 14 to begin to pull flexible solar array 22 back towards spool assembly 20. A small downward movement of flexible solar array 22 pushes spring and lever action release and retraction mechanism 18 down to catch the set pin and lock main tension spring mechanism 14 from further retraction.

In another embodiment of the invention, a spooling mechanism might comprise a reversible motor and sprocket drive mechanism. In another embodiment, a hand crank could be utilized to provide the same function.

Referring again to FIGS. 1 and 4, after spool assembly 20 is mounted to the desired object, support, or the like, and flexible solar light array material 22 is unrolled and extended, supports 44, such as poles, braces, guide wires, and/or the like, are secured in support pole bases 46 or otherwise to thereby support and secure the awning in accordance with one embodiment of solar awning system 10.

Figure 5:
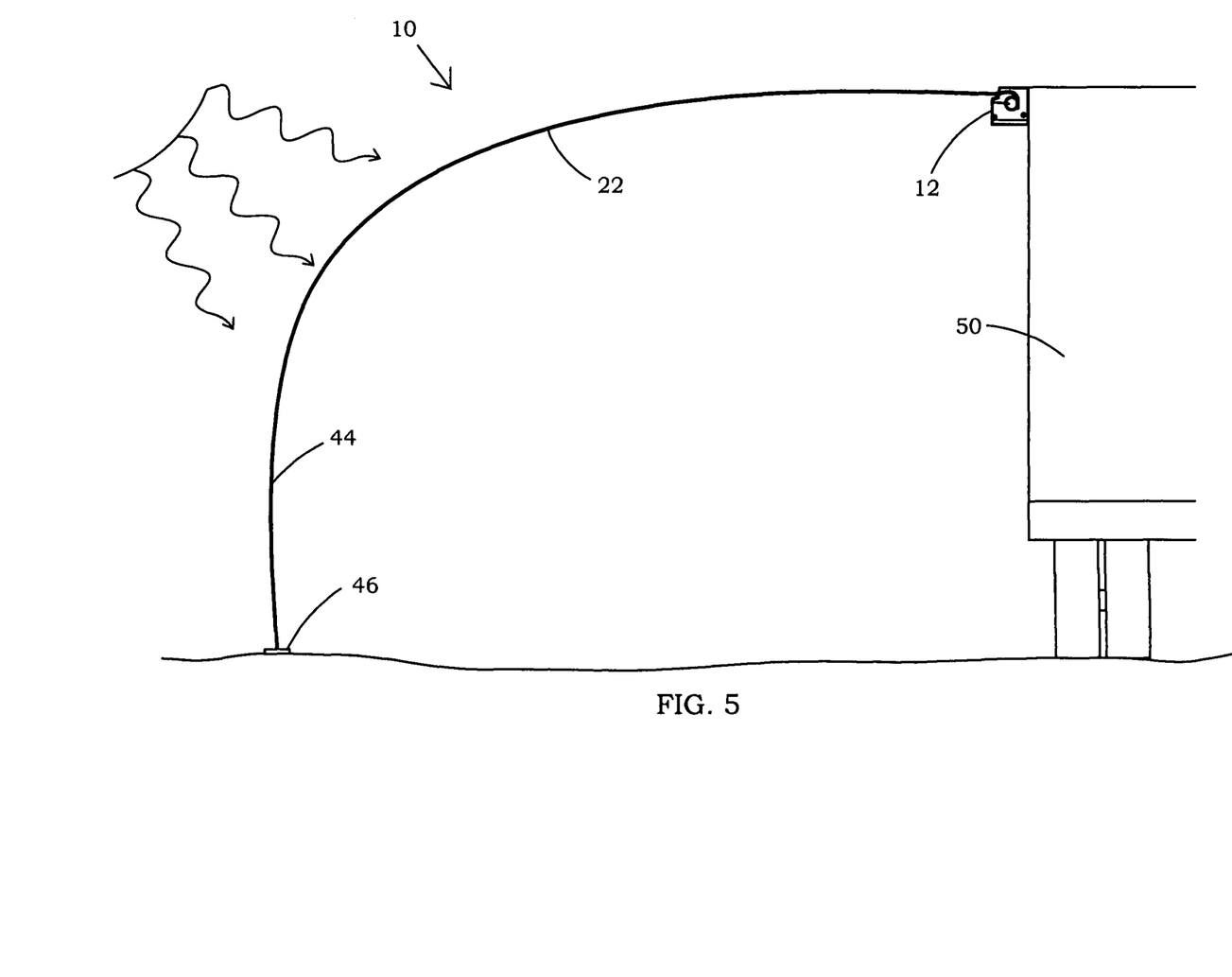
FIG. 5 is a side elevational view of the system of FIG. 2 in accordance with one possible embodiment of the invention.

Referring to FIGS. 2 and 5, flexible graphite strength members are utilized as supports 44. In this example, supports 44 may be attachable as support members at the sides of flexible solar light array material 22 to provide support therefor. In this embodiment, flexible solar light array material 22 could be secured on opposite ends using flexible graphite strength supports 44 similar to traditional tent systems. Spool housing 12 attaches to vehicle or other object as previously described herein. Supports 44 may fit into slots along the peripheral edges of flexible solar light array material 22 and can then be secured within pole bases 46 on the ground. This construction causes flexible solar light array material 22 to be curved, providing flexible solar light array material 22 longer access to solar energy as the sun moves throughout the day. Additionally, this embodiment may provide additional shelter from the sun UV rays because flexible solar light array material 22 forms an awning with not only a ceiling, but also a partial wall.

Once it is set up, awning system 10 provides a large shaded area underneath, as depicted in FIGS. 1, 2, 4, and 5. Electrical energy is provided to power or charge ancillary equipment from outlets 16, 17, and 19. LED lights 23 can be powered by the rechargeable battery when flexible solar light array material 22 is no longer capturing solar energy.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention is presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A solar awning to provide a shaded and lighted region, comprising:
    a spool housing;
    a flexible sheet of flexible solar light array material rolled into a spool within said spool housing, said spool of flexible solar light material being rotatably mounted for spooling and unspooling said flexible sheet to and from said spool housing to cover and uncover said shaded and lighted region;
    said flexible sheet of flexible solar light array material further comprising,
        a plurality of solar cells affixed to said flexible sheet,
        a plurality of solar cell electrical conductors affixed to said flexible sheet and electrically connected to said plurality of solar cells,
        a plurality of lights affixed to said flexible sheet,
        a plurality of light electrical conductors affixed to said flexible sheet and electrically connected to said plurality of lights; and
    a spooling mechanism mounted to said spool housing operable for said spooling and unspooling said flexible sheet to and from said spool housing for covering and uncovering said shaded and lighted region.

2. The solar awning of claim 1, further comprising a rotary connector to electrically connect to said plurality of solar cell conductors and said plurality of light conductors.

3. The solar awning of claim 2, further comprising a rechargeable battery operably connected to said plurality of solar cell electrical conductors through said rotary connector for receiving power from said plurality of solar cells.

4. The solar awing of claim 3, wherein said rechargeable battery is mounted within said spool housing.

5. The solar awning of claim 3, further comprising a switch operably connected to said rechargeable battery and to said plurality of light conductors through said rotary connector to turn on and off said plurality of lights.

6. The solar awning of claim 3, further comprising at least one power outlet operably connected to said rechargeable battery.

7. The solar awning of claim 1, further comprising a plurality of supports for supporting said flexible sheet above said shaded and lighted region when said flexible sheet is unspooled from said spool housing.

8. The solar awning of claim 6, wherein said plurality of supports are curved whereby said flexible sheet provides a rounded covering above said shaded and lighted region.

9. A method for making a solar awning to provide a shaded and lighted region, comprising:
    forming a flexible sheet of flexible solar light array material comprising a plurality of solar cells, a plurality of lights, and electrical conductors;
    rolling said flexible sheet onto a spool;
    rotatably mounting said spool of flexible solar light material within a spool housing for spooling and unspooling said flexible sheet to and from said spool housing;
    electrically connecting a rotary connector to said plurality of solar cells through a plurality of solar cell electrical conductors, which are electrically connected to said plurality of solar cells on said flexible sheet;
    electrically connecting said rotary connector to said plurality of lights through a plurality of light electrical conductors which are electrically connected to said plurality of lights; and
    affixing a spooling mechanism to said housing to control said spooling and unspooling said flexible sheet to and from said spool housing for covering and uncovering said shaded and lighted region.

10. The method of claim 9, further comprising operably connecting a rechargeable battery to said plurality of solar cell electrical conductors through said rotary connector for receiving power from said plurality of solar cells.

11. The method of claim 10, further comprising operably connecting a switch to said rechargeable battery and to said plurality of light conductors through said rotary connector to turn on and off said plurality of lights.

12. The method of claim 10, further comprising operably connecting at least one power outlet to said rechargeable battery.

13. The method of claim 9, further comprising providing one or more supports for supporting said flexible sheet above said shaded and lighted region when said flexible sheet is unspooled from said spool housing.

\* \* \* \* \*